United States Patent [19]

Arabian

[11] 4,335,833
[45] Jun. 22, 1982

[54] SOAP SOLUTION DISPENSER

[75] Inventor: Sandro Arabian, Vaduz, Liechtenstein

[73] Assignee: Europtool Trust, Vaduz, Liechtenstein

[21] Appl. No.: 164,187

[22] Filed: Jun. 30, 1980

[30] Foreign Application Priority Data

Jul. 17, 1979 [CH] Switzerland ............ 6623/79

[51] Int. Cl.³ .................................. B67D 5/22
[52] U.S. Cl. ........................................ 222/23
[58] Field of Search .............. 350/96.24; 222/23, 81, 222/83; 239/343; 250/577

[56] References Cited

U.S. PATENT DOCUMENTS

| 1,886,288 | 11/1932 | McDow . | |
|---|---|---|---|
| 2,319,244 | 5/1943 | Cascio et al. | 239/343 X |
| 3,120,125 | 2/1964 | Vasel | 250/577 X |
| 3,531,021 | 9/1970 | Bassett . | |
| 3,709,433 | 1/1973 | Oberfell et al. | 239/343 X |
| 4,053,002 | 10/1977 | Ludlow . | |
| 4,214,676 | 7/1980 | Cassia | 222/83.5 |

FOREIGN PATENT DOCUMENTS 1175005 7/1964 Fed. Rep. of Germany .
1623936 6/1971 Fed. Rep. of Germany .
2057467 4/1971 France .
2103683 3/1972 France .

Primary Examiner—Stanley H. Tollberg
Attorney, Agent, or Firm—Werner W. Kleeman

[57] ABSTRACT

A soap solution dispenser for use in public and private lavatories, washrooms and so forth, has a refill cartridge for aqueous soap solution. This exchangeable refill or supply cartridge has a flexible connecting member mounted upon a hollow plug element of a solution level indicator. During use of the dispenser, first the cartridge is emptied, then the solution level indicator, and only then a reservoir within the dispenser. Thus, the contents of the cartridge can be used up completely, while the dispenser still remains operative because of the reservoir volume, until such time as the cartridge can be conveniently replaced. For higher contrast indication of the solution level, the indicator can contain an optical body or element which is immersed in the soap solution. The optical element only becomes totally internal reflecting when the refill cartridge is empty. Prisms can be provided so as to optimize the use of existing sources of light, and optical filters can be employed for an indication in color.

4 Claims, 5 Drawing Figures

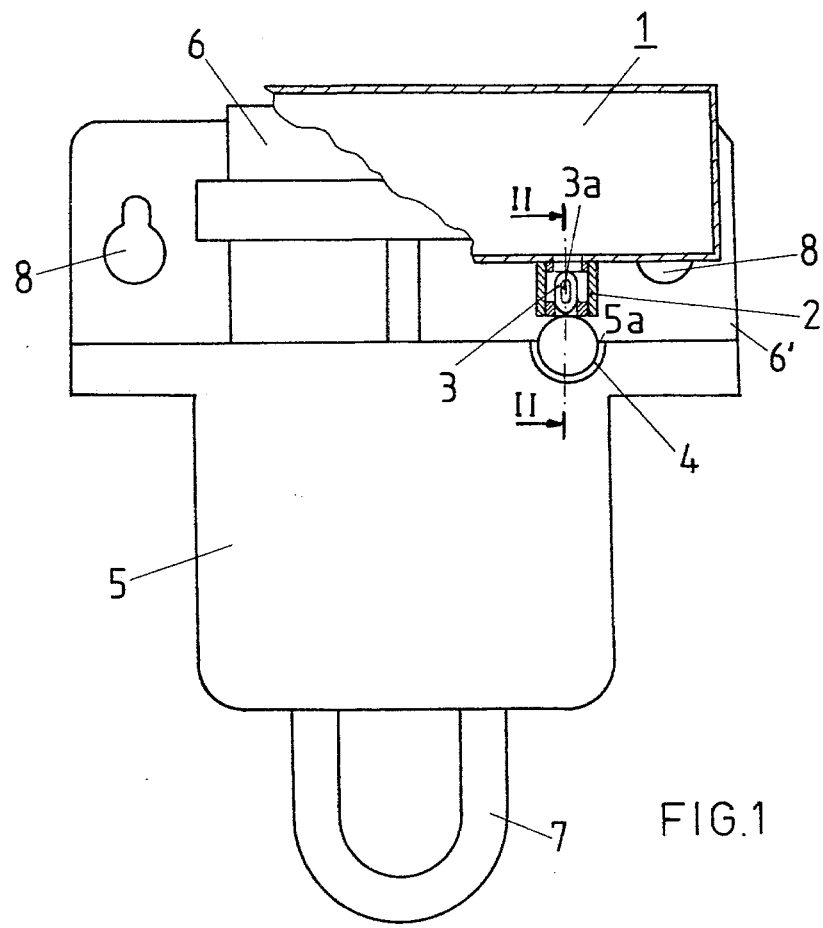
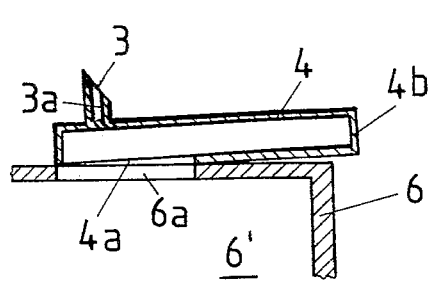
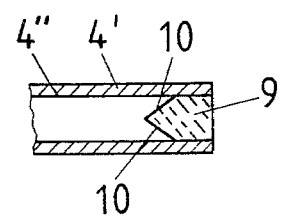
FIG.1
FIG.2
FIG.3

SOAP SOLUTION DISPENSER

CROSS-REFERENCE TO RELATED CASE

This application is related to my commonly assigned, copending U.S. application Ser. No. 06/142,003, filed Apr. 21, 1980, and entitled: APPARATUS FOR DOSING AND FORMING SOAP FOAM.

BACKGROUND OF THE INVENTION

The present invention relates to a new and improved construction of soap solution dispenser which is of the type comprising an exchangeable refill cartridge or supply container which is housed in a housing or casing and designed to hold aqueous soap solution, a device for emptying the cartridge or container, a solution level indicator, and a device for producing separate portions of soap foam.

There are already known to the art soap solution dispensers of the aforementioned general type (exemplified by soap dispensers of CWS International AG, a Swiss firm located at Zurich, Switzerland) which are used to dispense soap in numerous public and private lavatories, washrooms and similar facilites, in order to hygienically wash the hands of persons using such facilities.

Due to frequent use of such equipment, there is particularly prevalent the problem of refilling the aqueous soap solution. The supply containers or cartridges which are presently employed, working with solution level monitoring, are afflicted with the drawback that they require a relatively tedious replacement procedure for exchanging the spent cartridges or supply containers. Furthermore, the liquid level monitor is coupled with a reverse system for the aqueous soap solution, and thus, there is no clear indication of whether or not the cartridge is empty.

SUMMARY OF THE INVENTION

Therefore, with the foregoing in mind it is a primary object of the present invention to provide a new and improved construction of soap solution dispenser which is not associated with the aforementioned drawbacks and limitations of the prior art proposals.

Another and more specific object of the present invention aims at providing a new and improved construction of a soap solution dispenser wherein the refill cartridge or supply container can be exchanged in a most simple manner.

Yet a further significant object of the present invention aims at providing a new and improved construction of soap solution dispenser which allows for complete dispensing of the contents of the supply container or cartridge, while affording a reserve volume of aqueous soap solution which is then used in the meantime until the spent refill cartridge can be replaced by a new cartridge, to avoid undesired interruption in the use of the soap solution dispenser.

Now in order to implement these and still further objects of the invention, which will become more readily apparent as the description proceeds, the soap solution dispenser of the present development is manifested by the features that the refill cartridge or supply container is provided with an at least partially elastic connecting member, and the device for emptying the cartridge or container is provided with at least one plug element having a bore. According to a further feature of the invention the plug element is provided with a solution level indicator, and the refill cartridge, plug element and solution level indicator from communicating vessels. Due to this design an empty refill cartridge or container can be immediately optically indicated, and at the same time at the foam-building device there is available a reverse of aqueous soap solution, so that sufficient time is available in order to exchange the empty or spent refill cartridge without interruption in service.

It is further contemplated to have the soap solution indicator in direct connection with the refill cartridge or container. Hence, it is possible to use a single unit which serves, on the one hand, for emptying the refill cartridge and, on the other hand, for simultaneously indicating its filled level.

A viewing window may be provided for the solution level indicator and which is visibly readily accessible to the user. The viewing window is arranged above an outflow or drain opening of the solution level indicator. This construction affords a very simple and practical arrangement, particularly since the solution or filling level indicator is automatically emptied when the refill or supply cartridge is completely empty, so that there is no waste or loss of soap solution and/or the cartridge is not prematurely replaced by a new one owing to faulty indication of the remaining contents of the refill cartridge.

The outflow or drain opening of the solution level indicator may be connected by means of a hose with the foam-producing device. Hence, there is afforded the advantage that the refill cartridge can be easily exchanged due to the presence of the flexible hose or tubing.

It is also possible to provide the solution level or filling indicator, at the side accessible to the observer or user, with an optical element or body having at least one totally reflecting boundary surface or interface. Due to the use of an optically dense optical element, for instance formed of glass, acrylic glass or equivalent material, there is afforded a high contrast in the level indication. In particular, when the refill container or cartridge is empty then there is produced within the optical element a total internal reflection.

This optical element or body may be colored or there can be provided an optical filter which is mounted in front of the optical element at the side of the observer or user. Hence, there is afforded a particularly effective level indication in color.

If the optical body is constructed as a light guide or optical fiber, then there is realized the advantage that there is a spatial separation between the draining or outflow system and the housing wall.

The optical element may be coupled with a bundle of optical fibers or light guides, with the result that there is afforded a high degree of flexibility in the design and assembly of the equipment.

Also, it is possible to mount a prism or Fresnel lens on the observer's side of the solution level indicator. This affords the advantage of a high-contrast indication, making optimum use of the available ambient light.

Finally, the refill cartridge may be made of a flexible material and closed by at least one central and/or laterally arranged elastic connecting member. This construction is particularly economical to manufacture and also makes good use of the available space within the housing.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic front view, partially in section, of a soap solution dispenser according to the invention, the cover having been removed in order to reveal internal structure;

FIG. 2 is a fragmentary sectional view, taken along the line II—II of FIG. 1, showing details of the solution level indicator used in the arrangement of FIG. 1;

FIG. 3 is a fragmentary sectional view of a variant embodiment of the solution level or filling indicator shown in FIG. 2, here employing a totally reflecting, conical-shaped element which is incorporated at the side of the observer or user;

DETAILED DESCRIPTION OF THE PREFERRED EMBODIMENTS

Figure 4:
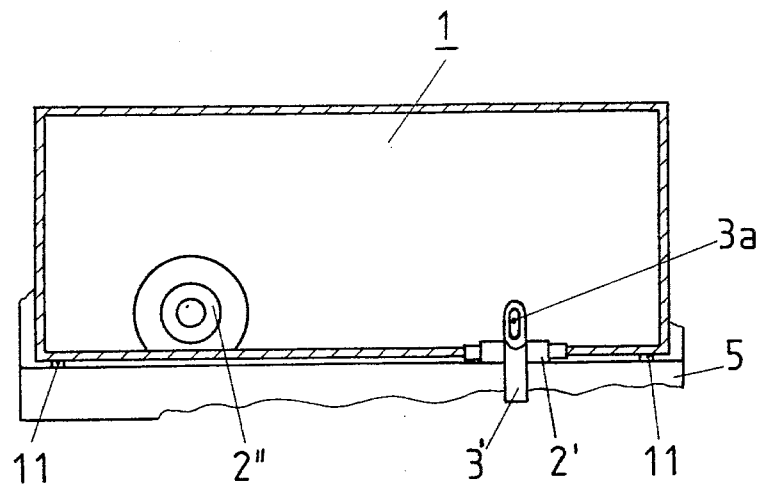
FIG. 4 is a schematic view of a further embodiment of a refill or supply cartridge equipped with a lateral connecting member for introducing a hollow plug for solution level monitoring and a drain plug mounted at the bottom side of the refill cartridge or container.

Describing now the drawings, in FIG. 1 reference character 1 designates a refill cartridge or supply container at which there is attached a connecting member 2 which is at least partially elastic. Extending into the connecting member 2 is a hollow plug element 3 having a bore 3a. This plug element 3 is mounted upon a tubular-shaped solution level indicator or filling level indicator 4 which extends out of a bore 5a provided in a housing or casing 5. The solution level indicator 4 is connected with the reservoir section or supply container 6' of a foam-producing device 6. The foam-producing device 6 has an actuation lever 7 for the production of separate portions of soap foam. Any suitable construction of foam-producing device 6 can be employed, and possible constructions of foam-producing devices 6 have been disclosed in my aforementioned U.S. application Ser. No. 06/142,003, filed Apr. 21, 1980, to which reference may be readily had and the disclosure of which is incorporated herein by reference.

The exemplary embodiment of soap solution dispenser illustrated in FIG. 1 is designed to be mounted upon a wall, for instance close to a washbasin in a lavatory, by using the mounting holes 8 or equivalent fastening expedients. The supply container or refill cartridge 1 may be formed of rigid polyvinylchloride (PVC) to which there is affixed, for instance by welding, the connecting member 2 formed of soft PVC.

As long as aqueous soap solution is contained within the supply container or cartridge 1, the front side 4b of the solution level or filling indicator 4 appears dark on the observer's or user's side, but it appears bright as soon as the solution level indicator 4 is empty, indicating that the time has come to exchange the refill cartridge or container 1. To this end a not particularly shown cover is removed from the housing 5 in order to expose the refill cartridge 1. This cartridge or container 1 is then simply pulled off of the hollow plug 3 and a new full cartridge 1, together with its connecting member 2, which is still closed by a membrane, is then mounted on the hollow plug 3 and the membrane pierced. By slightly perforating the upper wall of the supply container or refill cartridge 1 air from the surrounding atmosphere can be admitted into the cartridge 1. Now the bore 3a of the hollow plug 3, the solution level indicator 4 and equally the reservoir 6' contained within the foam-producing device 6 are then filled with aqueous soap solution. After the removed housing cover has been remounted the soap solution dispenser is ready for use without any interruption.

Continuing, in FIG. 2 there have been shown details of the construction of the solution level indicator 4 and the hollow plug element 3 of the arrangement of FIG. 1. The solution level or filling level indicator 4 and the hollow plug 3 are advantageously formed of one-piece and consist of a suitable transparent plastic, such as acrylic glass. The solution level indicator 4 will be seen to contain an elongated drain or outflow opening 4a which mates with a slot-shaped opening 6a provided in the reservoir 6' of the foam-producing device 6.

Details of a modification of the design of FIG. 2 will be seen by referring to FIG. 3. Here, an optical body or element 9 made of, for instance, glass is secured, for instance adhesively bonded in the tubing 4" of the solution level indicator 4'. This optical body or element 9 has a conical boundary surface 10 which is totally internally reflecting in air and is attached into the tubing 4" of the solution level indicator 4' at the side of the soap solution dispenser viewed by the user or observer.

This type of level or filling indicator 4' affords a higher degree of contrast, since the incident light is transmitted into the denser medium, i.e. into the soap solution, where it is absorbed when the refill cartridge or container 1 is full. However, the light undergoes total internal reflection at the surface 10 and the indicator appears bright when the refill cartridge 1 and along therewith the level indicator 4' are empty.

FIG. 4 illustrates a further modification of refill cartridge or supply container 1 having a base-mounted-connecting member 2' for the bottom outflow of the soap foam and a lateral connecting member 2" for solution level monitoring.

The mode of operation of the arrangement of FIG. 4 is the same as that of FIG. 1, except that here the refill cartridge 1 consists of coated paper and is flexible. Suitable naps or ribs 11 serve as reinforcement means and as a support for the refill cartridge 1 at the housing 5. This modification has the advantage that it can be fabricated extremely economically and allows for improved utilization of the space available within the housing 5. The lateral connecting member 2" is attached, for instance by means of an adhesive bond, near to the base or bottom region of the refill cartridge 1, and through such connection member 2" there can be inserted a solution level or filling indicator 4 having at its end a hollow plug.

Figure 5:
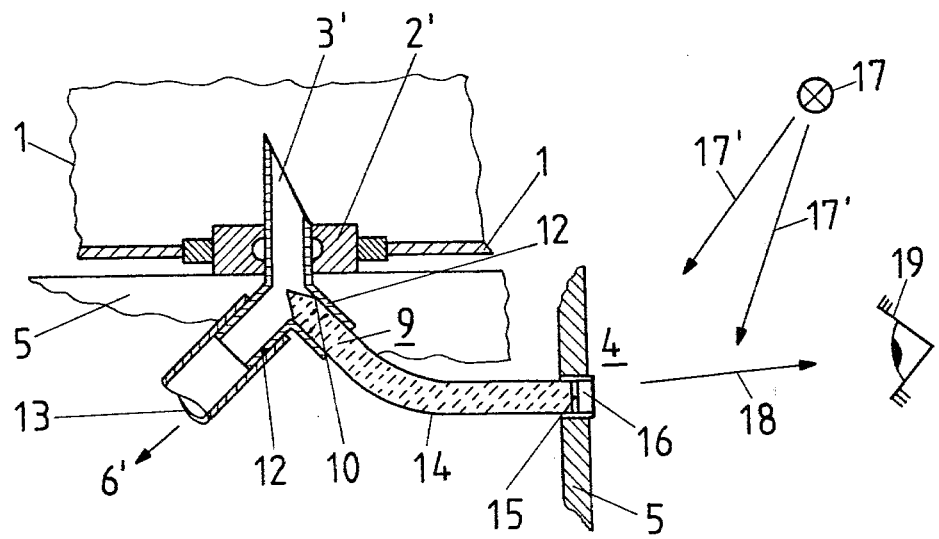
FIG. 5 is a fragmentary sectional view of a drain plug having a branched arrangement and integrated filling or solution level indicator equipped with an optical filter and Fresnel lens or prism.

A preferred embodiment of refill cartridge or supply container 1 with connecting member 2' and solution level indicator 4, integrated in the drain or outflow plug 3' thereof, has been shown in FIG. 5. There will be seen the hollow plug 3' with its two branches or branch portions 12. A flexible rubber tubing or hose 13, for instance formed of rubber, leading to the reservoir 6', is attached to the left-hand branch or branch portion 12 of the hollow plug 3'. A slightly curved light guide 14, for instance formed of acrylic glass, leads to the front of the housing 5 and is inserted into the right-hand branch or branched portion 12 of the hollow plug 3'. This light guide 14 likewise possesses within the right-hand illustrated branch portion 12 a boundary surface 10 which totally internally reflects light in air. Moreover, the light guide 14 is polished at its outer surface, and an optical filter 15, for instance a red filter, is mounted at the end of such light guide 14. A commercially available Fresnel lens or prism 16 is mounted after the optical filter 15.

This arrangement is particularly suitable for use in rooms where there is provided illumination 17 at the ceiling. The light rays 17' emanating from the illumination source 17 are refracted by the Fresnel lens or prism 16, enter the light guide 14, and are transmitted into and absorbed by the aqueous soap solution when the solution level indicator 4 is filled. Now the indicator appears dark. However, when the solution level indicator 4 and the refill cartridge 1 are empty, then the surface 10 totally reflects the light and produces a bright, clear image for the observer, generally indicated by reference character 19, because the light rays 18 extend almost horizontally from the Fresnel prism or lens 16.

The soap solution dispenser of the invention can be modified in a number of different ways as will suggest themselves to those skilled in the art, without departing from the teachings and underlying principles of the invention. For instance, it is also possible to construct the cover of the dispenser housing such that the supply container or refill cartridge is centered, and the membrane contained in the connecting member is automatically punctured upon closing of the cover, rendering the dispenser ready for use. Instead of providing a plurality of prisms (Fresnel lenses) it would be of course also possible to use a single prism of greater structural height or dimension.

The form of the refill cartridge is preferably chosen such that there is afforded a maximum filling volume. The connecting member serving for the outflow of the soap solution should be located at the lowest part of the refill cartridge so as to enable complete emptying thereof.

For soap solutions with high wetability the totally internally reflecting surface 10 should be advantageously coated with a non-wetting surfactant, such as commercially available silane compounds.

The refill cartridge or container can be completely or partially formed of transparent material. In this case, there can be directly monitored the supply of the soap solution. Accordingly, part or all of the housing also can be transparent. Equally, when using an appropriately designed supply container or cartridge there can be dispensed with the use of a cover.

While there are shown and described present preferred embodiments of the invention, it is to be distinctly understood that the invention is not limited thereto but may be otherwise variously embodied and practised within the scope of the following claims. Accordingly,

What I claim is:

1. A soap solution dispenser comprising:
    a housing;
    an exchangeable refill cartridge for dispensing aqueous soap solution arranged in said housing;
    means for emptying aqueous soap solution from said refill cartridge;
    level indicator means for indicating the level of the soap solution in said refill cartridge;
    means for producing portions of soap foam from said soap solution;
    said refill cartridge having a connecting member which is at least in part elastic;
    at least one hollow plug having a bore provided for said means for emptying said refill cartridge;
    said solution level indicator being provided for said hollow plug;
    said refill cartridge, said hollow plug and said solution level indicator forming communicating vessels;
    said solution level indicator being in direct communication with said refill cartridge;
    said solution level indicator having an outflow opening;
    means defining a viewing window for the solution level indicator; and
    said viewing window being arranged above said outflow opening and being visually accessible to an observer of the solution dispenser.

2. The soap solution dispenser as defined in claim 1, wherein:
    said foam-producing device comprises tubing means; and
    said outflow opening communicating with said tubing means.

3. A soap solution dispenser comprising:
    a housing;
    an exchangeable refill cartridge for dispensing aqueous soap solution arranged in said housing;
    means for emptying aqueous soap solution from said refill cartridge;
    level indicator means for indicating the level of the soap solution in said refill cartridge;
    means for producing portions of soap foam from said soap solution;
    said refill cartridge having a connect-member which is at least in part elastic;
    at least one hollow plug having a bore provided for said means for emptying said refill cartridge;
    said solution level indicator being provided for said hollow plug;
    said refill cartridge, said hollow plug and said solution level indicator forming communicating vessels;
    said solution level indicator having an outflow opening;
    means defining a viewing window for the solution level indicator; and
    said viewing window being arranged above said outflow opening and being visually accessible to an observer of the solution dispenser.

4. The soap solution dispenser as defined in claim 3, wherein:
    said foam-producing device comprises tubing means; and
    said outflow opening communicating with said tubing means.

* * * * *